Figure 1:
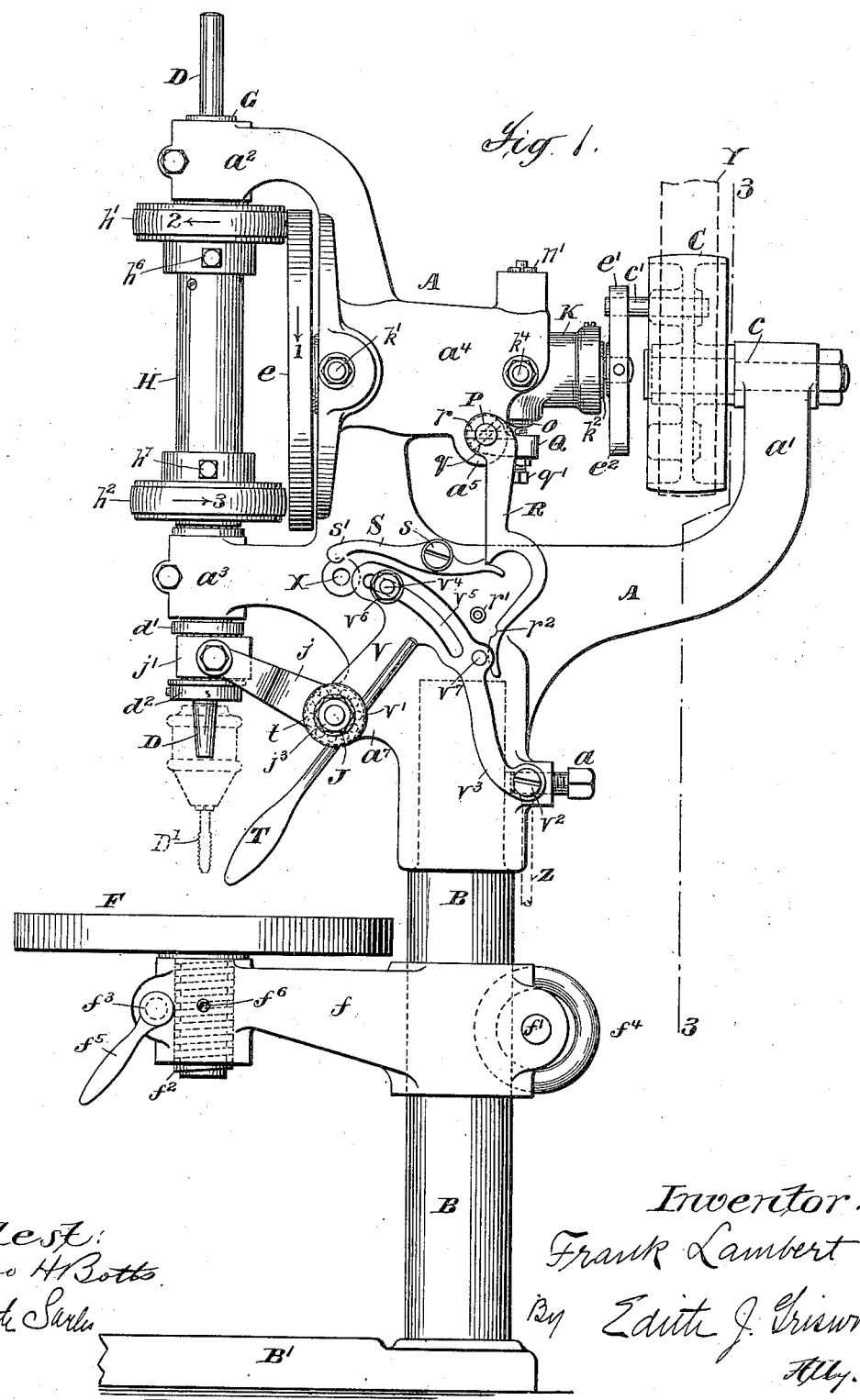

No. 688,653.  
F. LAMBERT.  
TOOL OPERATING MACHINE.  
(Application filed Dec. 5, 1900.)

Patented Dec. 10, 1901.

(No Model.)

3 Sheets—Sheet 1.

Attest:  
Geo H Botts  
Edith Sarle

Inventor:  
Frank Lambert  
By Edith J. Griswold  
Atty.

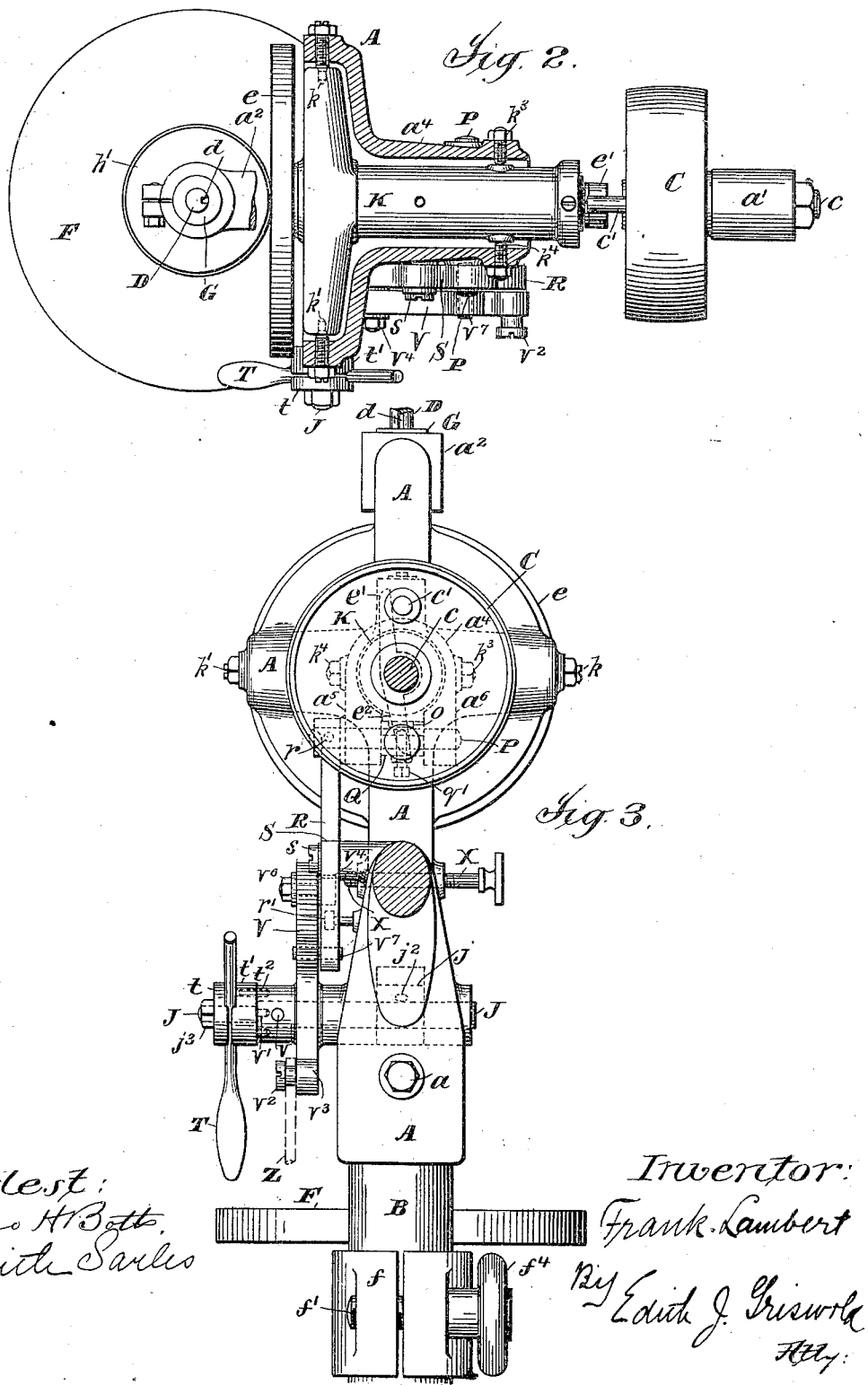

No. 688,653. Patented Dec. 10, 1901.
F. LAMBERT.
TOOL OPERATING MACHINE.
(Application filed Dec. 5, 1900.)
(No Model.) 3 Sheets—Sheet 3.
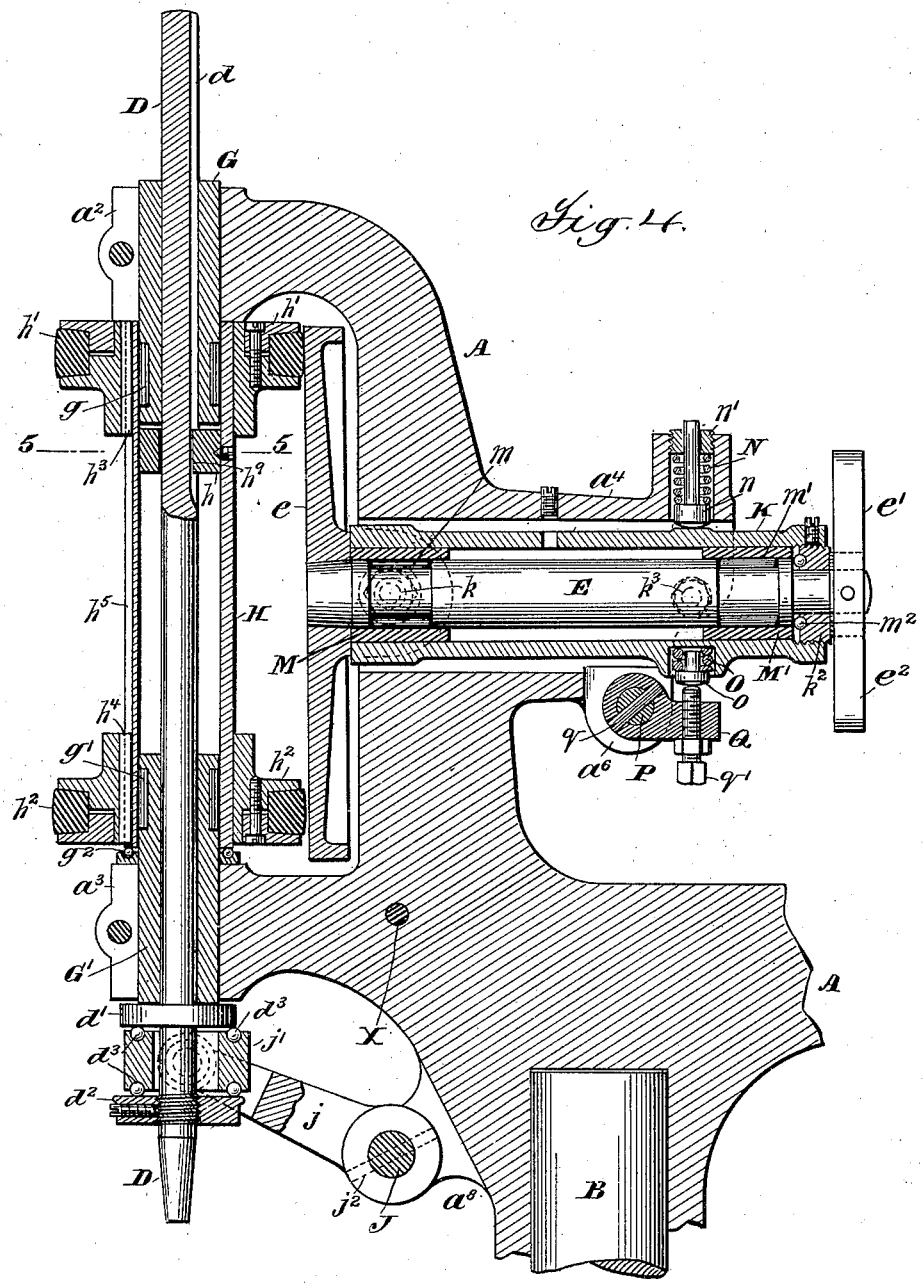

UNITED STATES PATENT OFFICE.

FRANK LAMBERT, OF BROOKLYN, NEW YORK, ASSIGNOR OF ONE-HALF TO GEORGE T. MONTGOMERY, OF NEW YORK, N. Y.

TOOL-OPERATING MACHINE.

SPECIFICATION forming part of Letters Patent No. 688,653, dated December 10, 1901.

Application filed December 5, 1900. Serial No. 38,819. (No model.)

*To all whom it may concern:*

Be it known that I, FRANK LAMBERT, a citizen of the United States, and a resident of Brooklyn, Kings county, State of New York, have invented Improvements in Tool-Operating Machines, of which the following is a specification.

This invention relates to improvements in tool-operating machines.

I have shown my improvements applied to a combined tapping and drilling machine; but it will be evident that such improvements may be applied to other tool-operating machines.

In the accompanying drawings, Figure 1 is a side elevation of a machine embodying my improvements. Fig. 2 is a plan view of Fig. 1, having a portion of the top of the frame cut away. Fig. 3 is a rear elevation of the machine, having the rear part of the frame cut away on line 3 3 of Fig. 1. Fig. 4 is a sectional elevation of a portion of Fig. 1, drawn to a larger scale; and Fig. 5 is a sectional view taken on line 5 5 of Fig. 4.

Referring to the drawings, the frame A is adjustably secured to the pillar B, rising from the bed-plate B', in any suitable way, as by the set-screw $a$. The rear extension $a'$ of the frame A, Fig. 1, carries the spindle $c$ of the driving-pulley C, which may be driven by a belt Y. (Shown in dotted lines in Fig. 1.) The forward extensions $a^2 a^3$ of the frame A carry the bearings for the tool-spindle D, and the central portion $a^4$ of the frame holds the bearing for a free intermediate shaft E, adapted to convey motion from the main driving-pulley C to the tool-spindle D, as hereinafter explained.

The work-table F is carried by an arm $f$, having two split-ring portions, one adapted to encircle the pillar B and to be secured thereto by the bolt $f'$ and the other adapted to encircle the shank $f^2$ of the table F and to clamp the same by means of the bolt $f^3$. The bolts $f'$ and $f^3$ are provided with suitable hand-wheels or handles $f^4 f^5$ to enable the operator to readily loosen and tighten the bolts for purposes of adjustment. When the bolt $f'$ is loosened, the arm $f$ may be adjusted in height on the pillar B, and when the bolt $f^3$ is loosened the table F may be rotated to turn its shank $f^2$ in the arm $f$. This shank $f^2$ is threaded, and a pin $f^6$, carried by the arm $f$, enters the groove in the threaded shank and acting as a nut causes the table F to rise and fall as the latter is rotated.

Referring more particularly to Fig. 4, bushings G G', firmly clamped in the forward extension $a^2 a^3$ of the frame A, constitute interiorly the bearings for the tool-spindle D and exteriorly the bearings for a hollow shaft H. Antifriction-rollers $g\ g'$ are placed between the shaft H and the bushings G G', and the lower end of the shaft H rests upon ball-bearings $g^2$. A sleeve $h$, secured within the shaft H, is provided with a key $h^9$, Figs. 4 and 5, entering the key-slot $d$ in the spindle D, whereby the said spindle is rotatably connected to the shaft H, but free to move longitudinally therein. The shaft H carries friction-wheels $h'\ h^2$, which may be secured thereto in any suitable manner, as by the keys $h^3\ h^4$ on the wheels entering the slot $h^5$ on the shaft H, Figs. 4 and 5, and by set-screws $h^6\ h^7$, Fig. 1. When the set-screws $h^6\ h^7$ are loosened, these wheels may be moved longitudinally on the shaft H for purposes of adjustment of speed, as hereinafter explained.

To provide for moving the tool D' (shown in dotted lines in Fig. 1) and the spindle D to and from the work-table F, a rock-shaft J, pivoted in lugs $a^7\ a^8$ on the frame A, carries a fork $j$, swiveled to the yoke $j'$, surounding the spindle D, Figs. 1 and 4, which yoke works between the shoulder $d'$ on the spindle and a nut $d^2$, secured to the spindle. The yoke $j'$ slides on antifriction-balls $d^3$ between the yoke and the parts $d'\ d^2$. The fork $j$ is secured to the shaft J by pin $j^2$. The rock-shaft J has also secured thereto a lever V by pin $v$, and clutch-collars $t\ t'$ to clamp a handle T are passed over the end of the shaft J and the whole tightened up by the nut $j^3$. A pin $t^2$, Fig. 3, which may extend from the clutch-collar $t'$, enters one of several holes $v'$ in the hub of the lever V. By shifting the pin $t^2$ from one hole $v$ to another when the parts are loose the handle T may be adjusted to any position the operator desires. Also when the nut $j^3$ is loosened the handle T may be moved in the clutch-collars $t\ t'$ to adjust its length. To turn the rock-shaft J, the handle T may be used, or a treadle may be connected to the shoulder of the screw $v^2$, Figs. 1, 2, and 3, on the extension $v^3$ of the lever V for this purpose. When a treadle is not used, the extension $v^3$ of the lever V is preferably weighted to balance the weight of the spindle D; but the treadle-lever Z, Fig. 1, and parts connected thereto serve the same purpose when used.

The shaft E, Fig. 4, carries at one end a disk $e$, constituting the driver of the tool-spindle, as hereinafter explained, and at the other end a double arm $e'$ $e^2$, Figs. 1 to 4, with which arm the pin $c'$ of the pulley C comes in contact to rotate the shaft E when the pulley is in motion. The space between the pulley C and the end of the shaft E, Fig. 1, is sufficient to permit the belt to be crossed if it be desired to change the direction of rotation of the main driver or pulley C and the shaft E without unlacing the belt. This construction leaves the intermediate driver free from the main driver C except as to rotation, whereby the intermediate driver may be tilted or adjusted in various ways, as hereinafter explained, wholly independent of the main driver, so that the tension of the belt Y produces no strain on the axis of the intermediate driver.

Referring to Figs. 2, 3, and 4, the shaft E is supported in a long sleeve K, branched outward at the forward end and pivoted at $k$ $k'$ to the frame A. Within the pivoted sleeve K are bushings M M', between which and the shaft E are antifriction-rollers $m$ $m'$, and the rear end of shaft E is supported by ball-bearings $m^2$, held by the ball-cup $k^2$, adjustably secured in the rear end of the sleeve K. This pivoted sleeve K is adapted to be turned on its pivots $k$ $k'$ to bring the disk or driver $e$ into frictional contact with the wheels $h'$ $h^2$ alternately through the action of the springs N and O, Fig. 4. The spring N, acting through the buffer $n$, tends to press the rear end of the sleeve K downward. The tension of this spring may be adjusted by the nut $n'$. The spring O, when compressed, tends to press the sleeve K upward, and means are employed to vary the force of the spring O, so that at one time this force will be sufficient to overcome the force of the spring N and tilt the sleeve K, shaft E, and disk $e$ until the disk comes into contact with the friction-wheel $h'$, as shown in Figs. 1 and 4, while at another time this force is either nil or so weak that the spring N automatically tilts the sleeve K, shaft E, and disk $e$ in the other direction until the disk $e$ comes into contact with the wheel $h^2$. The bolts $k^3$ $k^4$ act to adjust and steady the sleeve K.

The means shown for varying the active force of the spring O are as follows: A rock-shaft P, pivoted in lugs $a^5$ $a^6$ of the frame A, has secured thereto an arm Q by pin $q$, Figs. 1 and 4, and a lever R by pin $r$, Figs. 1 and 3, so that arm Q and lever R move together with the shaft P. The arm Q carries an adjusting-screw $q'$, upon which the buffer $o$ rests. When the arm Q is in the position shown in the drawings, Figs. 1 and 4, the spring O is compressed, through the buffer $o$, by the screw $q'$, and the adjustment of this screw in the arm Q adjusts the tension of the spring O during the time this latter is compressed. Referring to Fig. 1, when the lever R is moved to the right it rocks the shaft P, which in turn raises the arm Q, whereby the spring O is compressed. A trip-pawl S, pivoted to the frame A at $s$, is adapted to engage the lever R and hold the parts in the position shown. To automatically trip the pawl S, the lever V, which turns with the rock-shaft J when the tool-spindle D is moved up and down, carries an adjustable stud $v^4$ in a position to hit the tail $s'$ of the pawl S at a certain time, as hereinafter explained. The stud $v^4$ has a reduced portion passing through the slot $v^3$ in the lever V and may be secured in any desired position in the slot by the nut $v^6$. When the stud $v^4$ hits the tail $s'$, the pawl S is tripped and releases the lever R. This relieves the tension of spring O and allows the spring N to act upon the sleeve K to force the disk $e$ into contact with the friction-wheel $h^2$. To automatically move the lever R again into the position shown to compress the spring O, the lever V is provided with a pin $v^7$, into the path of which the lower end of lever R has been forced by action of spring O when the pawl S has released the lever. A stop $r'$, Figs. 1 and 3, limits the motion of the lever R when disengaged. It will be evident that when the disk $e$ is in an intermediate position—that is, when its axis of rotation is at right angles to a line passing through the points of contact with the wheels $h'$ $h^2$—the disk will not touch either wheel. A groove $r^2$ in the lever R is so situated that when engaged by the pin $v^7$ of the lever V the springs N and O will counterbalance each other and the shaft E be held in such a position that the disk $e$ will be out of contact with both of the wheels $h'$ and $h^2$. A long pin X, mounted in the frame A, is adapted to be slid out into the path of the stud $v^4$ and at a point to prevent the stud coming in contact with the pawl S, for purposes hereinafter explained; but in machines requiring alternating rotary motion of the tool this pin plays no part and is withdrawn from the path of the stud $v^4$, as shown clearly in Fig. 3.

*Operation of the machine.*—When the machine is to be used for tapping threads in holes, it is necessary to rotate the tool first in one direction and then in the opposite direction. It will be noted that the wheels $h'$ $h^2$ are situated on opposite sides of the axis of rotation of the disk or driver $e$, so that continuous rotary motion in one direction of the disk $e$ will impart rotary motion to one wheel in one direction and to the other wheel in the opposite direction when frictional contact is made. As explained hereinbefore, the disk $e$ is forced into frictional contact with the wheels alternately by simply tilting the disk and its axis of rotation in relation to the axis of rotation of the wheels. Supposing the machine to be adjusted as hereinafter explained, the main driver or pulley C to be started, whereby its pin $c'$, acting upon the arm $e'$ $e^2$, will rotate the free intermediate driver—namely, the shaft E and disk $e$—and the article to be operated upon to be placed upon the work-table F, the handle T is first raised (or otherwise moved to turn the rock-shaft J) until the pin $v^7$ on the lever V has forced the lever R backward into the position shown (or this may be done by means of the treadle) and the pawl S has engaged the lever R to prevent its return. This motion compresses the spring O and forces the disk $e$ into frictional contact with the wheel $h'$, and supposing the disk $e$ to be rotating in the direction of the dart 1, Fig. 1, the wheel $h'$ and the tool will rotate in the direction of dart 2. The handle T is then lowered (or otherwise moved to turn the rock-shaft J in the other direction) to bring the tool D' down to the work on the table. In cutting the thread in the work held on the table the tool is drawn down farther, carrying with it the yoke $j'$ and the fork $j$, which turns the rock-shaft J until the stud $v^4$ hits the tail $s'$ to trip the pawl S, when the lever R is released. The force of spring O having been relieved, the spring N immediately tilts the sleeve K and the shaft E the other way, forcing the disk $e$ into frictional contact with the wheel $h^2$ and rotating the wheel in the direction of dart 3, Fig. 1, which thus reverses the direction of rotation of the tool-spindle and tool. By this reverse motion the tool practically works itself up and out of the threaded hole. Before the next operation the operator must move the handle T (or treadle) far enough to force the lever R back into position to be engaged by the pawl S and to compress the spring O, as explained. If it is desired to stop the tool-spindle without stopping the driving mechanism, the lever V is moved to a position in which its pin $v^7$ will engage in the groove $r^2$ of the lever R. This will hold the arm Q (through lever R and shaft P) in a position to compress the spring O just enough to counterbalance the spring N, so that the sleeve K and shaft E are held in an intermediate position with the disk $e$ out of contact with both of the wheels $h'$ $h^2$, and consequently no motion will be imparted from the disk to the shaft H. When it is desired to have the tool rotated in one direction only, as in drilling holes, the pin X is moved out into the path of the adjustable stud $v^4$ and when the tool has drilled down to a certain depth the stud comes into contact with the pin X. This prevents farther downward motion of the tool and also prevents the tripping of the pawl S, so that the tool will continue to rotate in the same direction.

*Adjustments.*—When alternating rotation of the tool-spindle D is required, the pulley C is run in a direction to impart the proper rotary motion to the tool while performing its work through the wheel $h'$—that is, when the spring O is compressed. By adjusting the tension of springs N and O the friction between the surfaces $e$ and $h'$ may be brought to a degree proportionate to the amount of force the operator can exert to push the lever R back until engaged by the pawl S. As the reverse motion of the tool is generally simply to withdraw the tool from the work after the operation has been performed, it is evident that the friction between the disk $e$ and the wheel $h^2$, produced by the spring N, need not be great.

From the foregoing it will be seen that the operator can adjust the amount of friction for performing the work required up to the full limit of his own strength, while the return motion of the tool is automatically effected by the simple tripping of a catch-pawl. Also by this arrangement of gearing and tripping mechanism a construction can be adopted permitting of great friction without the least strain on the tool-spindle. The balancing of the tool-spindle and the reducing of all the friction except for rotating the spindle permits very delicate work to be performed by a machine made according to this invention, yet the friction for rotating the spindle can be made sufficient to tap screw-threads in comparatively very large holes, as well as in very small holes.

To change the speed of the tool-spindle without changing the speed of the driving power or pulley C or to change the speed of the tool-spindle with the change of direction of its rotation, it is only necessary to shift the wheels $h'$ $h^2$ longitudinally on the shaft H. It will be evident that the nearer the wheels are to the axis of rotation of the disk $e$ the slower the shaft H will be rotated, and vice versa, and consequently if one wheel is nearer this axis of rotation of the disk $e$ than the other wheel the shaft H will receive one speed when one wheel is in contact with the disk $e$ and a different speed when the other wheel is in contact with the disk. For example, if it is desired to run the tool slowly while cutting a screw-thread, but swiftly when the tool is being withdrawn, the wheel $h'$ should be moved nearer the center of the disk than the pulley $h^2$. These speed adjustments permit of various relative motions. For instance, with the disk $e$ rotating in one direction only it may be made to impart continuous rotary motion in one direction or intermittent rotary motion in either direction or alternating rotary motion, and with the disk $e$ rotating at a given speed the driven shaft may rotate at various speeds in relation thereto or at various differential speeds when rotating alternately in opposite directions, the change in speed occurring at the moment of change of direction.

For various reasons it may be desirable to change the amount of necessary tilting of the disk $e$ to make contact with the wheels $h'$ $h^2$. To adjust the amount of angular motion of the disk $e$, (shaft E and bearing K,) the ball-cup $k^2$, Fig. 4, is screwed in or out, thereby moving the disk $e$ through shaft E nearer to or farther from the wheels $h'$ $h^2$, and it will be evident that the nearer the disk $e$ is to the wheels the smaller will be the angular motion of the disk necessary to bring it into contact with a wheel from the neutral position or from contact with one wheel to contact with another.

To provide for cutting or threading holes to various depths, the stud $v^4$ and table F are adjusted when the machine is stopped. The coarsest adjustment is made by moving the arm $f$, carrying the table F, up or down on the pillar B when the bolt $f'$ is loosened. The next finer adjustment is made by means of the stud $v^4$. The nut $v^6$ is loosened, the tool D is brought down toward the table F, and the work is laid on the table at the side of the tool. When the tool has been brought down to a position at the side of the work that the operator considers low enough for cutting to the proper depth, while holding the tool in this position he moves the stud $v^4$ until it touches the tail $s'$ of the trip-pawl S when reverse motion of the tool is to take place or until it touches the pin X, moved out into its path, when the tool is to continue running in the same direction, but only to a certain depth, and then secures the stud in its adjusted position by tightening the nut $v^6$. The finest adjustment is then made by loosening the bolt $f^3$ by handle $f^5$ and rotating the table F and its shank $f^2$ to raise or lower the table, as hereinbefore explained.

When a new driving-belt Y is applied to the machine, the frame A is adjusted high up on the pillar B by the set-screw $a$, so that the frame may be gradually moved down the pillar to adjust and give tension to the belt as it stretches.

While I have shown my improvements applied to one form of operating-machine only, I do not limit my invention to this particular form nor to the exact construction of any of the various parts, and in the claims the word "shaft" is not meant to be limited to the hollow shaft shown, but is meant to cover any equivalent rotatable shaft, since this shaft could be the tool-spindle itself or might be connected to and drive the tool in various other ways. Also while it is preferable to have the wheels $h'$ $h^2$ adjustable on the shaft this is not essential, so that the element composed of the shaft H and the wheels $h'$ $h^2$ may be one body of quite a different outline, and the frictional-contact circular parts, equivalent to the wheels $h'$ $h^2$, may be different sizes, without departing from my invention. In fact, as shown, when the machine is ready for operation the wheels form a part of the shaft H.

The darts shown in Fig. 1, hereinbefore explained, show the direction of motion of the gearing for operating a screw-tap when right-handed screw-threads are to be cut. When a left-hand screw-thread is to be cut, the pulley C must be run in the opposite direction, (by crossing the belt Y, as explained, or otherwise,) so that the tapping motion is still imparted through wheel $h'$, as hereinbefore mentioned, and the releasing motion of the tap through the wheel $h^2$.

I claim as my invention—

1. In a tool-operating machine, the combination of a main driver and a tool-spindle, with a free intermediate driver adapted to be rotated by said main driver, but to be tilted independently thereof into and out of frictional gear with said tool-spindle.

2. In a tool-operating machine, the combination of a tool-spindle capable of rotary motion in both directions, and having an alternating lengthwise motion, with a tilting driver frictionally geared with said spindle, and means for automatically reversing the direction of rotation of said spindle, at the end of a lengthwise motion thereof.

3. In a tool-operating machine, the combination of a tool-spindle capable of rotary motion in both directions, and having an alternating lengthwise motion, and means for adjustment for varying the length of said motion, with a tilting driver frictionally geared with said spindle, and means for reversing the direction of rotation of said spindle at each end of its lengthwise motion.

4. In a tool-operating machine, the combination of a tool-spindle capable of lengthwise motion and rotary motion in both directions, with a tilting driver frictionally geared with said spindle, and means operated by the lengthwise motion of said spindle to reverse the direction of rotation of the spindle, at any predetermined length of motion of said spindle.

5. In a tool-operating machine, the combination of a tool-spindle capable of lengthwise motion and rotary motion in both directions, with a tilting driver frictionally geared with said spindle, and means operated by the lengthwise motion of said spindle to reverse the direction of rotation of the spindle, and to change the rate of speed of the tool-spindle with its change of direction of rotation.

6. In a tool-operating machine, the combination of a tool-spindle capable of rotary motion in both directions, and having an alternating lengthwise motion, with a tilting driver frictionally geared with said spindle, and means for automatically reversing the direction of rotation of the spindle and changing its rate of speed, at the end of a lengthwise motion thereof.

7. In a tool-operating machine, the combination of a shaft capable of rotary and lengthwise motion, and a rotary driver adapted to impart rotary motion to the shaft and to change the direction of such motion by a change in the angular position of its axis of rotation, with means operated by the lengthwise movement of said shaft for changing the said angular position of the axis of rotation of said driver.

8. In a tool-operating machine, the combination of a shaft capable of rotary and lengthwise motion, and a rotary driver adapted to impart rotary motion to the shaft and to change the direction of such motion by a change of the angular position of its axis of rotation, with means operated by the lengthwise movement of said shaft for changing the said angular position of the axis of rotation of said driver, said means being capable of adjustment to produce the change at various predetermined lengths of motion of said shaft.

9. In a tool-operating machine, the combination of a rotatable shaft, and a rotatable driver capable of coming into frictional contact with the shaft at either of two points on opposite sides of the axis of rotation of said driver but on the same side of the axis of rotation of the said shaft, with two forces acting oppositely tending to hold the parts in contact at one or the other of said points, and means for changing the relative strength of the two forces whereby the driver may be brought into contact with the wheels alternately.

10. In a tool-operating machine, the combination of a rotatable shaft, and friction-gearing adapted to impart alternating rotary motion thereto, with mechanism whereby friction to rotate the shaft in one direction may be applied by the operator, and a device adapted to hold the said mechanism in the position given it by the operator but to be tripped by a moving part of the machine to release said mechanism.

11. In a tool-operating machine, the combination of a rotatable shaft, and friction-gearing adapted to impart alternating rotary motion thereto, with two springs acting oppositely to apply the friction for the two motions, one of said springs adapted to exert a greater force than the other, and means for decreasing and reproducing this initial greater force.

12. In a tool-operating machine, the combination of a rotatable shaft, and friction-gearing adapted to impart alternating rotary motion thereto, with two springs acting oppositely to apply the friction for the two motions, one of said springs adapted to exert a greater force than the other, and means for decreasing and reproducing this initial greater force, and means for adjusting the force of the two springs, relatively one to the other.

13. In a tool-operating machine, the combination of a rotatable shaft, and a rotatable driver therefor, having its axis of rotation at an angle to the axis of rotation of said shaft, with means whereby a change in the angle between the axes of rotation will produce a change of direction of rotation of said shaft without change of direction of said driver, a force constantly tending to hold the parts at one angle to each other, and a second greater force adapted to be applied by the operator to hold the parts at another angle to each other.

14. In a tool-operating machine, the combination of a rotatable shaft, and a rotatable driver therefor, having its axis of rotation at an angle to the axis of rotation of the said shaft, with means whereby a change in the angle between the axes of rotation will produce a change of direction of rotation of said shaft without change of direction of said driver, a force constantly tending to hold the parts at one angle to each other, and a second greater force adapted to be applied by the operator, to hold the parts at another angle to each other, and means for automatically releasing the said greater force.

15. In a tapping-machine, the combination of a tool-spindle capable of rotary motion in both directions and having an alternating lengthwise motion, with a tilting driver frictionally geared with said spindle, and means for reversing the direction of both the rotary and the lengthwise motions of said spindle without reversing the direction of motion of said driver, and instantaneously changing both said rotary and lengthwise motion from one predetermined rate of speed to another predetermined rate of speed with the change of direction without change of speed of the driver.

16. In a tool-operating machine, the combination of a main driver and a tool-spindle, with an intermediate tilting driver rotated by the main driver and frictionally geared with said tool spindle, and means for adjusting the driving power of said intermediate driver independently of said main driver.

17. In a tool-operating machine, the combination of a main driver, and a tool-spindle, with a free, intermediate driver, adapted to be rotated by said main driver but to be tilted independently of the main driver into and out of frictional gear with said tool-spindle, the said intermediate driver being adjustable to vary the amount of tilt necessary to produce friction.

18. A combined tapping and drilling machine, comprising a tool-spindle capable of lengthwise motion and rotary motion in both directions, and a driver adapted to rotate the said spindle in either direction, in combination with mechanism adapted to automatically reverse the direction of rotation of said spindle at a predetermined length of motion, and a device adapted to coöperate with said mechanism to prevent the reversing of the rotary motion of the tool-spindle, and to stop the lengthwise motion in one direction at any predetermined length of motion.

19. In a tool-operating machine, the combination of a rotatable shaft with a rotatable driver, the two said parts adapted to have their axes of rotation changed to tilt the parts into and out of contact, and means for automatically effecting the said relative change.

20. In a tool-operating machine, the combination of a rotatable shaft with a rotatable driver, the said shaft and driver adapted to have their axes of rotation changed in relation one to the other, to tilt the parts into and out of contact at either of two points on opposite sides of the axis of rotation of one but on the same side of the axis of rotation of the other, and means for automatically effecting the said relative change.

21. In a tool-operating machine, the combination of a rotatable shaft with a rotatable driver, the said shaft and driver adapted to have their axes of rotation changed in relation one to the other, to tilt the parts into and out of contact at either of two points on opposite sides of the axis of rotation of one, but on the same side of the axis of rotation of the other, and means for automatically changing from one of said points of contact to the other at various predetermined times.

In testimony whereof I have signed my name to this specification in the presence of two subscribing witnesses.

FRANK LAMBERT.

Witnesses:
EDITH J. GRISWOLD,
EDITH SARLES.